United States Patent [19]
Khudenko

[11] Patent Number: 5,879,555
[45] Date of Patent: Mar. 9, 1999

[54] ELECTROCHEMICAL TREATMENT OF MATERIALS

[75] Inventor: Boris Mikhailovich Khudenko, Atlanta, Ga.

[73] Assignee: Mockba Corporation, Atlanta, Ga.

[21] Appl. No.: 804,355

[22] Filed: Feb. 21, 1997

[51] Int. Cl.[6] .................................. C02F 1/70; C02F 3/04; C02F 1/46

[52] U.S. Cl. ....................... 210/615; 210/631; 210/663; 210/717; 210/719; 210/722; 210/742; 210/743; 210/746; 210/747; 210/748; 210/757

[58] Field of Search ..................... 210/615, 631, 210/719, 748, 722, 743, 742, 746, 663, 747, 717, 757

[56] References Cited

U.S. PATENT DOCUMENTS

| | | |
|---|---|---|
| 3,640,821 | 2/1972 | Sweeny . |
| 3,737,384 | 6/1973 | Sweeny . |
| 4,382,865 | 5/1983 | Sweeny . |
| 4,642,192 | 2/1987 | Heskett . |
| 5,019,273 | 5/1991 | Fehsenfeld et al. ............... 210/719 |
| 5,122,274 | 6/1992 | Heskett . |
| 5,135,654 | 8/1992 | Heskett . |
| 5,149,437 | 9/1992 | Wilkinson et al. ............... 210/719 |
| 5,198,118 | 3/1993 | Heskett . |
| 5,266,213 | 11/1993 | Gillham . |
| 5,275,737 | 1/1994 | Heskett . |
| 5,314,623 | 5/1994 | Heskett . |
| 5,332,509 | 7/1994 | Murphy ........................... 210/719 |
| 5,348,628 | 9/1994 | Khudenko . |
| 5,411,664 | 5/1995 | Seech . |
| 5,415,770 | 5/1995 | Heskett . |
| 5,433,856 | 7/1995 | Heskett ........................... 210/757 |
| 5,472,618 | 12/1995 | Bolser ............................. 210/719 |
| 5,510,034 | 4/1996 | Heskett ........................... 210/757 |
| 5,565,107 | 10/1996 | Campen et al. ................... 210/757 |

OTHER PUBLICATIONS

Gould J.P., Escovar, I.B., Khudenko B.M., Examination of the Zinc Cementation of Cadmium in Aqueous Solutions, Wat. Sci. Tech. vol. 18 Rio. Ap.333–344, 1987.

Khudenko, B.M. Mathematical Models of Cementation Processes, ASCEJ of Env. Eng. vol. 113, No. 4, pp. 681–703, Aug. 1987.

Khudenko B.M., GOuld J.P. Specifics of Cementation Processes from Metals Removal. Fifth Int. COnf. IAWPRC, Advanced Wastewater Treatment and Reclamation, Proceedings, vol. 2, Technical University of Krakow, 25–27 Sep. 89.

Khudenko B.M., Feasibility Evaluation of a Novel Method for Destruction of Organics, Wat. Sci. Tech. vol. 23, Kyoto, pp. 1873–1881, 1991.

Vipic R.D., Pohland F.G., Remediation Technology Status Report: Treatment Walls. Prepared for Ground Water Remediation Technologies Analysis Center, Oct. 1996.

*Primary Examiner*—Neil McCarthy

[57] ABSTRACT

This is a method of treatment of materials with the use of a sacrificial metal and reducible ions which comprises steps of
 a) contacting the material to be treated with the surface of the said sacrificial metal, wherein the said material to be treated is included in an aqueous solution or emulsion or suspension; and
 b) inducing treatment processes at the surface of the said sacrificial metal by providing said reducible ions included in an electrolyte, wherein the said reducible ions react with the said sacrificial metal to form oxidation-reduction products comprising dissolved or suspended reduced species and dissolved or suspended species from oxidizing the said sacrificial metal.

The method can be used for treatment of water, groundwater, including in-situ, wastewater, polluted gases, solid waste, and other materials.

24 Claims, 3 Drawing Sheets

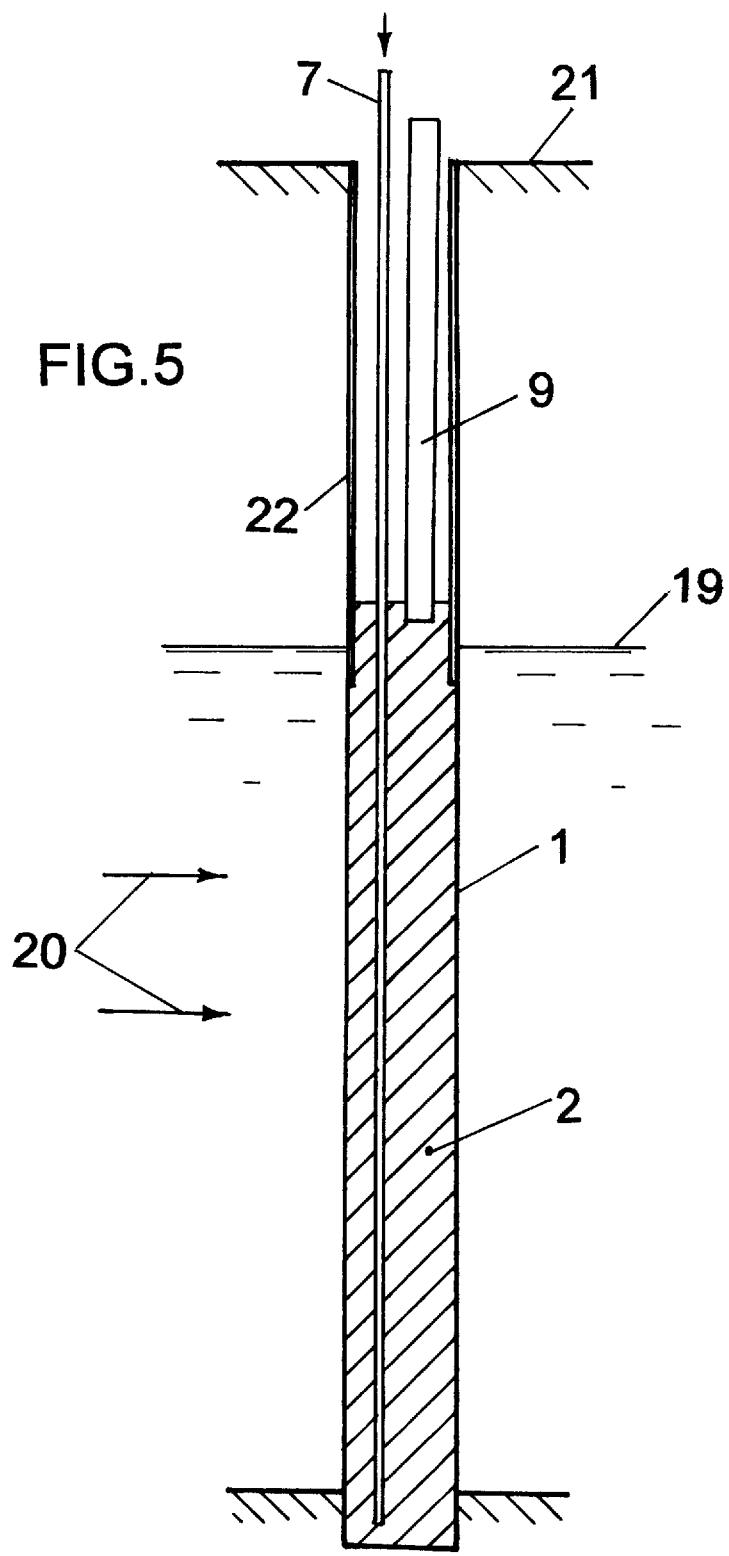

ELECTROCHEMICAL TREATMENT OF MATERIALS

FIELD OF THE INVENTION

The present method belongs to electrochemical treatment of materials found in gaseous emissions, wastewater, water, groundwater, solid waste, and other media containing organics, especially recalcitrant and toxic organics, heavy metals, and other constituents, the said method makes use of elemental metals as reagents.

PRIOR ART

Here, the following reactions and physical chemical processes involving elemental metals are of concern: reduction of organics by a single metal, transformations of organics by a metallic couple, cementation (metal displacement), and processes with migrational species transport at the sacrificial metal surface.

Reduction of organics by metals was described in 1913 by Clemmensen (R. T. Morrison and R. N. Boyd, "Organic Chemistry", Allyn and Bacon, Inc., Boston, 1973), many such reactions are described by J. March in "Advanced Organic Chemistry", McGraw-Hill Book Co., 1968. Sweeny (U.S. Pat. No. 3,640,821) teaches to use zinc in acidic media for partial decomposition of DDT. Gillham (U.S. Pat. No. 5,266,213) teaches to use metals placed underground for cleaning halogenated contaminants from groundwater. The Gillham process is also limited by anaerobic conditions in the treated water (Eh=−100 to −200 mV, abcense of oxygen and other oxidants). S. M. Shifrin, O. M. Spivakova, and I. G. Krasnoborod'ko ("On Color Removal from Textile Wastewater", Selected Parers of the Leningrad Civil Engineering Institute, Issue No. 69, 1971) demonstrated an aerated filter with a scrap steel for destruction of dyes. Contrary to Gillham, organics (COD) and color removals in this process improved with aeration. However, large quantity of sludge was generated. All elemental metal processes require the finely divided metals, preferably, metal dusts or submillimeter size particles. Metal reduction of organics is driven by the potential difference between grains in the metal lattice. The magnitude of such difference is small (about 0.1V). Accordingly, the organics transformation is very slow (hours to days) and incomplete (low removal of original compounds and high content of toxic residual products).

Metallic couples such as Ni—Al, Ni—Ag, etc. (Renay catalysts) are used in organic reduction and hydration processes, and for catalyzing oxidation-reduction in fuel cells (K. R. Williams, "Introduction to Fuel Cells", Elsevier, Amsterdam, 1966, B. V. Nekrasov, "General Chemistry", Moscow, Khimia, 1973). Sweeny (U.S. Pat. Nos. 3,773,384 and 4,382,865) teaches to use metallic couples for reductions and transformations of various organics. He prepares the bi-metal couples by grinding metal alloys into fine particles or by depositing the "second" metal on the "first", where the first metal is the expendable metal (hereinafter, it is called the sacrificial metal). R. D. Vidic and F. G. Pohland ("Remediation Technology Status Report: Treatmnet Walls", prepared for Ground-water Remediation Technologies Analysis Center, 615 William Pitt Way, Pittsburgh, Pa., October 1996) reviewed recent studies on and applications of the single metal and bi-metal (metal couples) processes for remediation of groundwater polluted with organics and heavy metals. The driving force in the metallic couple processes is the potential difference between two metals in an electrolyte (water being treated), which magnitude is 1 V.

Accordingly, the organics transformation is faster and more complete than in processes with the single sacrificial metal. Nonetheless, the use of finely divided sacrificial metals (powders, ground particles, or sponge and wool) does not insure sufficient organic's transformation in these systems. Additionally, there is always a concern that the second metal in a couple can solubilize and pollute the treated effluent with a toxic heavy metal.

Cementation (metal displacement) is also a process involving reductions of a second (noble) metal in solutions contacting a sacrificial elemental metal. Complex and contradictory behavior of cementation processes was described in many sources. B. M. Khudenko ("Mathematical Models of Cementation Processes", Journal of Environmental Engineering, ASCE, Vol. 113, No. 4, 1987, and U.S. Pat. No. 5,348,629), B. M. Khudenko and J. P. Gould ("Specifics of Cementation Processes", Water Science and Technology, IAWPRC, Vol. 24, No. 7, 1991), and J. P. Gould, I. B. Escovar, and B. M. Khudenko ("Examination of Zinc Cementation of Cadmium in Aqueous Solutions", Water Science and Technology, Vol. 19, 1987) have reexamined this process. All Khudenko publications and the patent given herein are incorporated into this invention by reference. In the new models cathodic and anodic sites are spontaneously induced at the sacrificial metal surface. In addition to the noble species, reacting species include hydrogen and hydride ions. At anodic sites, the sacrificial metal is dissolved thus freeing electrons which flow to the cathodic sites. At cathodic sites, hydrogen ions are adsorbed accept one electron, become monoatomic hydrogen which dissolves in the sacrificial metal, wherein it accepts one more electron and becomes hydride ion. This hydride ions react and reduce the noble species. The process rate, yield, and efficiency depend on the transportation regime of the reacting species in the system. At certain conditions (a given sacrificial metal, type and concentrations of noble species, pH, temperature, mixing rate, concentrations of indifferent ions, $Li^+$, $K^+$, or $Na^+$, concentration of anions, $Cl^-$, $SO_4^{--}$, presence and concentration of promoters, etc.) the noble species are transported from the bulk (solution to the cathodic sites by diffusion. For example, low or high concentrations of noble species and low or high mixing rates favor diffusional regime. At cathodic sites, they are reduced on the metal surface by hydrides and form considerably smooth deposits. Hydride ions revert to hydrogen ions which can take part in the next rotation at and in the metal. At intermediate conditions, the diffusional transport of noble species is replaced with migration (electric current) of hydrogen ions to the metal surface and hydride ions from the metal surface across a microscopic boundary layer at cathodic sites. Accordingly, hydride ions react with noble species at the outer side of the boundary layer. The solid products formed from the noble ions are solid primary particles. Such particles will travel across the boundary layer to the metal surface under the effect of electrophoresis and form powdery and rough deposits. Spontaneous processes at the metal surface occur in pulses. Certain amount of hydride is accumulated over time and than reacts with noble species. In migrational regimes, the accumulated charge of hydrides crosses the migration boundary layer as a microscopic plasma streamer. Diffusional cementation regimes have a slow to moderate process rate as for previously described metal and bi-metal organics reductions. Migrational regimes are very fast.

The advantages of the migrational regime for treatment of organics in electrolytes are described in our previous invention (U.S. Pat. No. 5,348,629). Additionally, methods of inducing migrational regime "across a membrane" and by high current density from an external source of electricity were shown. Both methods can eliminate the exposure of the treated solutions to the second (noble) metal. However, these methods can sometimes be inconvenient and require additional equipment. Although, introduction of heavy metals into the stream to be treated is excluded, the stream of electrolyte loaded with dissolved and sludge-like toxic heavy metals is generated.

Many original compounds and many organic products of the sacrificial metal treatment can be further degraded biologically. However, there are no accommodations in most present methods malting use of sacrificial metals for such treatment. U.S. Pat. No. 5,411,664 describes the use of fibrous organic material and multi-valent metals for combined treatment. However, this process is extremely slow and inconvenient for most applications, probably, except contaminated soils and solid waste. In water purification it is likely to cause the secondary contamination by decomposing organic fibers. There are no provisions for simultaneous contact of organics to be treated, the fiber, and the metal in biological wastewater treatment processes.

Accordingly, the main objective of this invention is to provide a rapid and efficient method for treatment of materials with elemental metals which is simple, excludes heavy metals from the treated streams and eliminates toxic residues, provides for additional chemical, physical chemical, and biological treatment of materials to be treated and intermediate products of the metal treatment. Other objectives of the present invention will become apparent from the following description.

SUMMARY OF INVENTION

This is a method of treatment of materials with the use of a sacrificial metal and reducible ions which comprises steps of a) contacting the material to be treated with the surface of the said sacrificial metal, wherein the said material to be treated is included in an aqueous solution or emulsion or suspension; and b) inducing treatment processes at the surface of the said sacrificial metal by providing said reducible ions included in an electrolyte, wherein the said reducible ions react with the said sacrificial metal to form oxidation-reduction products comprising dissolved or suspended reduced species and dissolved or suspended species from oxidizing the said sacrificial metal.

Reactions for inducing the treatment processes at the sacrificial metal surface can be presented as follows:

$$Me^0 + (n-1)Me^{n+} = nMe^{(n-1)+}, \text{ or}$$

$$rMe_1^0 + mMe_2^{n+} = rMe_1^{m+} + mMe_2^{(n-r)+},$$

respectively for the like and unlike metals. In contrast to the previous art, the reducible ions in these reactions are reduced to less oxidized ionic form and remain dissolved. The products of dissolution of the sacrificial metal are also dissolved ions. Both, the reduced ions and the ions derived from the sacrificial metal by its oxidation can be hydrolyzed and form metal hydroxides. Depending on pH, these hydroxides can form flocculent suspension. Unlike in the previous art, bi-metals are not formed. Moreover, both, the sacrificial metal and the added reducible ions are nontoxic metals such as iron and aluminum, metals which salts are used for water purification. Using these metals cannot pose any problems. Other substantial advantages of this method over the prior art will become apparent from the following description of various method modifications.

The said materials to be treated are selected from the group comprising organic compounds, suspended or emulsified particles, metal containing species, microorganisms, and combinations thereof. These materials undergo treatment selected from a group comprising oxidation or reduction, dimerization or polymerization, carbonization, opening of aromatic rings, saturating multiple bonds, removing functional zones, coagulation and flocculation, electrophoretic transport of suspensions and emulsions, electroosmotic transport of dissolved species, inactivation and killing of microorganisms, and combinations thereof.

The sacrificial metals are selected from the group comprising Zn, Al, Fe, Ni, and other metals, preferably producing no toxic materials when anodically dissolved. The reducible ions are selected from the group comprising higher valency Ni(III) and Fe(III) ions, or combinations thereof Some other ions with similar characteristics can also be used. These ions will usually be reduced to di-valent ions which will remain in solution or hydrolyze and form hydroxide suspensions. The reducible ions can be produced by a dissolution of a dry salt, an anodic dissolution of a metal, for example, a dissolution of iron electrode with the following chemical reaction (oxidation of Fe(II) to Fe(III). The reducible ions can be provided continuously or periodically. Periodic supply of these ions "strikes" the system by establishing strong electromagnetic fields in the system. Once established, these fields will survive for long time (hours to days) till relaxation occurs.

The rate and the efficiency of the present treatment process can be further increased by applying electric current to the said sacrificial metal from an outside source. Additionally, the rate and the efficiency of the said treatment processes are increased by steps selected from the group comprising the addition of at least one indifferent ion to said electrolyte, the addition of at least one anion to said electrolyte, the addition of at least one complexing agent to said electrolyte, the addition of at least one hydride compound to said electrolyte, optimizing pH of the said electrolyte, increasing temperature of the said electrolyte, optimizing the mixing rate of the said electrolyte, optimizing oxidation-reduction potentials in the said electrolyte, or a combination thereof. Further, the rate and the efficiency of the said treatment processes are increased by steps selected from the group comprising the addition of at least one indifferent ion to said aqueous solution, the addition of at least one anion to said aqueous solution, the addition of at least one complexing agent to said aqueous solution, the addition of at least one hydride compound to said aqueous solution, optimizing pH of the said aqueous solution, increasing temperature of the said aqueous solution, optimizing the mixing rate of the said aqueous solution, optimizing oxidation-reduction potentials in the said aqueous solution, or a combination thereof.

In some cases, the electrolyte and the aqueous solution containing material to be treated is the same solution. For example, the reducible ions can be added to the solution to be treated. Alternatively, the electrolyte containing the reducible ions is introduced to the sacrificial metal separately from the said aqueous solution, however, both can eventually mix in a reactor containing the sacrificial metal.

The sacrificial metal can be used in forms of finely divided metal pieces, medium size metal pieces, large size metal pieces, or combinations thereof. Finely divided pieces can include particles of metal dust or crushed metals (few microns to 500 or 1000 microns), thin wire like in steel wool, and similar materials. Medium size pieces would be particles of one to few millimeter size, including metal cuttings and shavings. Larger pieces can be from one centimeter to a meter size, or whatever is convenient to handle. Various scrap materials can be used. Sometimes, scrap needs additional shredding and cleaning. Preferably, the bulk of the said metal pieces are in electrical contact with each other so that the microscopic electrical circuits between anodic and cathodic sites on the sacrificial metal surface amplify each other and propagate through the most of the metal used in a treatment apparatus. Accordingly, the reducible ions can be provided only to a portion of the said metal pieces. Other pieces will be activated through the electrical contact with each other. Moreover, such propagation of electrical circuits throughout the entire electrically connected body of the sacrificial metal pieces can be provided across an electroconducting partition. For example, a reaction between $Fe(III)$ and $Fe^0$ can be conducted in a metal container electrically connected to the said sacrificial metal pieces. The container will be filled with the electrolyte containing $Fe(III)$, and the sacrificial metal pieces will be in contact with the aqueous solution containing materials to be treated, but the said electrolyte and the said aqueous solution are isolated hydraulically. Electrical circuits induced in the said container will transmit to the body of the sacrificial metal used for the said treatment of materials. The electroconducting container can be made from the same metal as the sacrificial metal. Such a container will corrode. It can also be made of a metal more noble than the sacrificial metal and the reducible species. Such container will not corrode, but a corrodible sacrificial metal needs to be placed inside of such container.

The metal pieces can be placed in a reactor, or other containing means, for example, underground well, a trench, or other structure. These pieces can form a continuous bed of sacrificial metal pieces, or smaller size pieces can be fluidized. Further, the continuous bed with the bulk of the particles in electrical contact can be placed in a bed of a filtration medium. For example, nonfluidizable (massive) metal pieces can be placed in a fluidized bed of a granular media (sand, granular activated carbon-GAC). Or such pieces can be placed in a filter of a dense granular media (such as water treatment filter with sand, or sand and gravel). During the operation of the granular bed in the fluidization regime or during the filter backwash, the metal pieces will sink in the fluidized or expanded bed of the granular media, form a self-supporting skeleton, and electrically contact each other. Voids between these pieces will be filled with the granular media. Gradually, metal pieces will be spent. They can be replaced by loading new metal pieces on the top of the combined granular media/metal bed. These new pieces will eventually sink in the granular media bed. The combined granular media/metal bed is a simple means for controlling the turbulence of flows around the metal pieces thus increasing the process rate and efficiency. Additionally, fluidizing the granular media within the metal bed will provide cleaning of the bed from any chemical deposits. The granular filtration medium can be gravel, sand, glass beads, coal, green sand, ceramsite (baked clay), ilmenite, garnet, plastic beads, granular activated carbon, synthetic adsorption media, zeolite, ion exchange resins, and combinations thereof. The granular bed can be used for filtration as in water filter. It can be an adsorption device for the original constituents in the aqueous solution and/or intermediate products of treatment of materials with the said sacrificial metal submerged in the granular bed. It can also be an ion exchange apparatus or a reactor for conducting chemical reactions, or other processes involving granular media/metal bed. Biological treatment of organics, particularly, anaerobic, is especially advantageous. It can be carried out with different granular media. For example, groundwater with biodegradable organics and biodegradable products from the metal treatment processes can be treated with GAC seeded with anaerobic, anoxic, aerobic, methanotrophic and other bacteria. Compounds for supporting biological processes, additional carbon sources, nutrients (N and P), and various micronutrients can be added to the filtration medium. The reducing conditions in anaerobic processes will additionally increase the rate and efficiency of the metal treatment processes.

Reduced ions, for example $Fe(II)$ or $Ni(II)$, and ions formed by dissolving the sacrificial metal, for example $Fe(II)$ or $Al(III)$, can be used for the further treatment. At approximately neutral pH, they form hydroxides, which can be used as coagulants for particles flocculation and sedimentation, or for direct coagulation/filtration in apparatus with granular media. In anaerobic processes, these ions will immobilize sulfides. They also will precipitate phosphorus.

The aqueous solution or emulsion or suspension which can be treated in the present process can be surface water, groundwater, drinking water, process water, wastewater, aqueous media from intermediate steps of water and wastewater treatment, aqueous based absorption media derived from gas treatment processes, aqueous based leachates separated from solid materials or solid waste, aqueous based leachates within solid materials or solid waste.

DESCRIPTION OF DRAWINGS

FIG. 5 is a system for in-situ treatment of groundwater.

PREFERRED EMBODIMENTS

Figure 1:
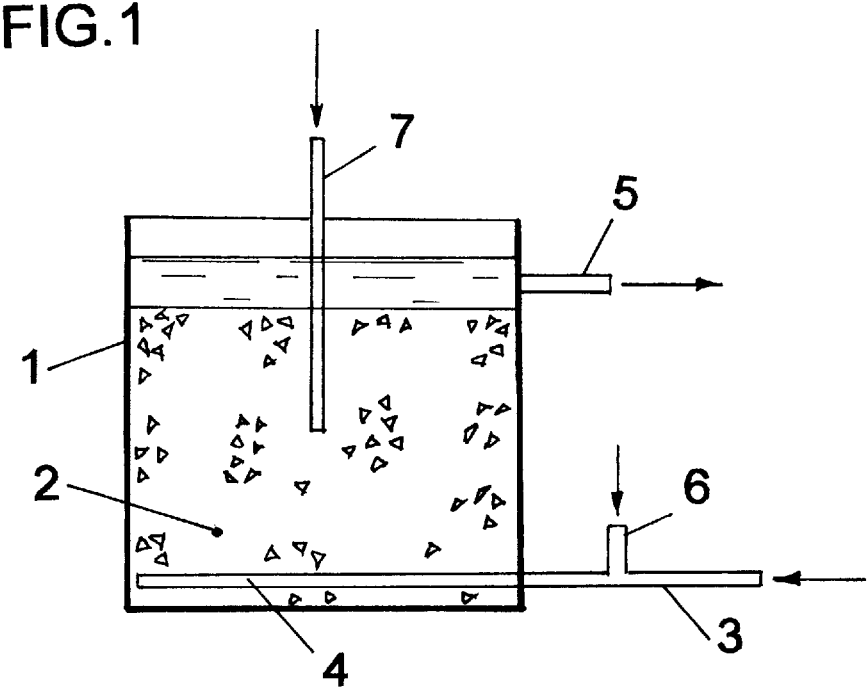
FIG. 1 is a reactor with the sacrificial metal bed.

Referring now to FIG. 1, there is shown a reactor comprising a reactor vessel 1, a bed 2 of the sacrificial metal pieces, an influent line 3 for feeding the aqueous solution of materials to be treated in the vessel 1, line 3 attached to a distribution manifold or other distribution means 4 in the vessel 1, an effluent line 5, a line 6 attached to the line 3 for feeding the electrolyte and other reagents for conducting and optimizing the treatment of materials, an alternative line 7 for feeding the electrolyte and other reagents for conducting and optimizing the treatment of materials.

The apparatus of FIG. 1 is operated as follows. The aqueous solution containing the materials to be treated is fed in the reactor 1 via line 3 and is distributed under the sacrificial metal bed 2 by using the distribution means 4, flows through and becomes treated by the bed 2, the treated effluent is collected at the top of the bed 2 and is discharged via line 5. The bed 2 can be made of fine, medium or large sacrificial metal pieces. Most practicable metals are Al and Fe, although many other metals can be used. The electrolyte containing the reducible ions and, optionally, reagents for optimization of the process rate and efficiency as previously described are fed in the line 6 and mixed with the aqueous solution in the line 3. This would result in a single mixed stream of the aqueous solution and the electrolyte contacting the said metal bed 2. Alternatively, the electrolyte can be fed via line 7. It can be either distributed in the volume of the entire bed 2, or it can be applied to a portion of the bed 2 at any location in the bed. In FIG. 1, line 7 ends at about the center of the bed 2, but it can be at any other location, provided that most of the metal pieces in the bed are electrically connected. Some other reagents for optimizing the process rate can also be fed through line 7, for example, reagents for pH adjustments, such as acids. Other reagents can be provided through line 6 and applied uniformly to the entire bed. Most preferably Fe(III) should be used as reducible ions, but other ions satisfying the requirements stated above, nontoxic and soluble or flocculent after reduction, can also be used. The added reducible ions induce the treatment processes to rapidly convert the materials to be treated. Particularly, various organics can be treated as previously described, some mineral materials can also be treated, for example, many heavy metals can be removed, nitrates and nitrites can be reduced to nitrogen, suspensions and emulsions can be collected and their constituents electrochemically converted. This apparatus can be used for treatment of water, groundwater (in pump-and-treat systems), industrial and other wastewater, and other waste and non-waste materials. Unlike the prior art, this is a very simple apparatus and operation which is free from toxicity associated with the bi-metal or other systems.

Figure 2:
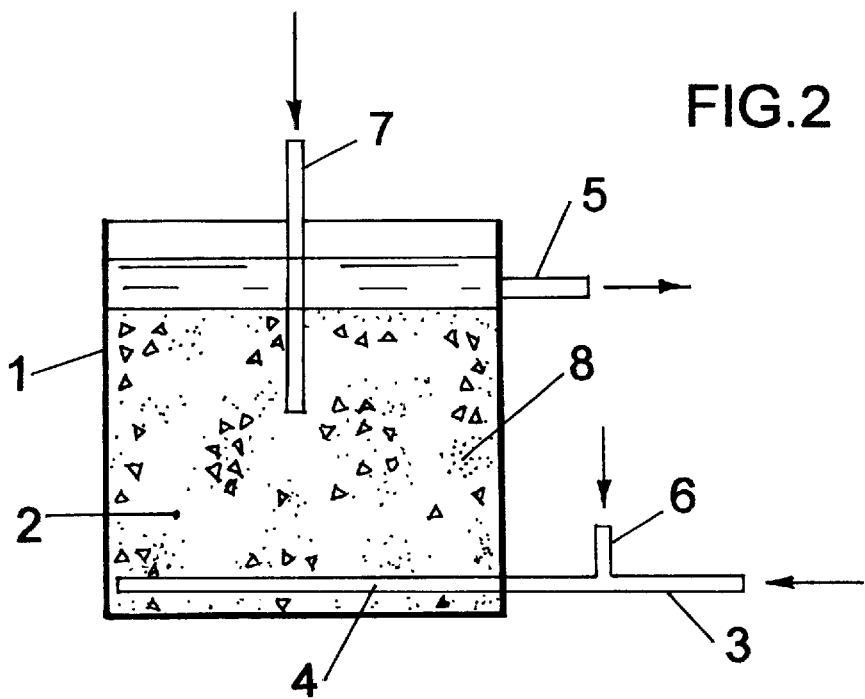
FIG. 2 is a filter with the sacrificial metal bed submerged in a bed of a granular filtration medium.

Referring now to FIG. 2, there is shown a reactor or a filter as described in FIG. 1 and further provided with a bed of a granular material 8 into which the bed of the sacrificial metal pieces is submerged. This embodiment is operated similarly to the one presented by FIG. 1, however, with additional advantages afforded by the use of the granular bed 8. For example, if the sand is used in the bed 8, in addition to the sacrificial metal treatment as previously described, the apparatus can be operated as a contact filter for water purification. The Fe(II) and possibly Al(III) ions would hydrolyze, if needed with pH correction, flocculate and trap the suspended and some dissolved solids in the water stream being treated, the said flocculated material is deposited on the sand grains and retained in the filter till the backwash operation. The filter can be backwashed with water, or with air and water. The deposited flocculated solids will be dislodged and carried away. It should be noted that the sand/metal filter can be operated in either upflow mode as illustrated in FIG. 2, or in a downflow mode as known in the art. The filter can be further improved by using bed 8 made of GAC. Particularly, the biodegradable products of the metal treatment and some constituents in the stream being treated will be adsorbed and, at least partially, biologically decomposed. Biological processes in the GAC can be further improved by seeding appropriate microorganisms. For example, anaerobic microorganisms, denitrifiers, and aerobic organisms can be used. Several zones holding and propagating these groups of organisms can be developed in the bed 8. There is an unexpected feedback in such a system: anaerobic microorganisms can lower oxidation reduction potential in beds 2 and 8 and further increase the metal treatment rate and efficiency. Another unexpected effect is that the turbulence can be increased in the apparatus with the metal/granular bed design as compared to metal bed, thus further increasing the process rate and efficiency. At optimal conditions, the electromagnetic fields in the metal filter are sufficiently strong for disinfection, including kill and deactivation of pathogenic bacteria, viruses, and cysts. The apparatus of FIG. 2 can be operated with some expansion of the granular bed or as a fluidized bed, or the motion of the granular bed particles can be produced during the backwash. In either case, the surface of the sacrificial metal pieces will be cleaned, thus further increasing the process rate and efficiency. Metal pieces are spent during the operation of the system. Spent metal can be replaced by adding new pieces at the top of the reactor 1 and by allowing them to sink under the force of gratuity during expansion, or fluidization, or backwashing of the bed. This is another improvement in the present method because it allows to maintain the tight contact between the metal and the granular material and between the metal pieces simultaneously. An unexpected advantage of combining the sacrificial metal be and the GAC bed is that GAC to metal contact promotes corrosion and can increase the rate and the efficiency of treatment of materials. Similar effect can be produced by adding powdered activated carbon to the treatment system.

Figure 3:
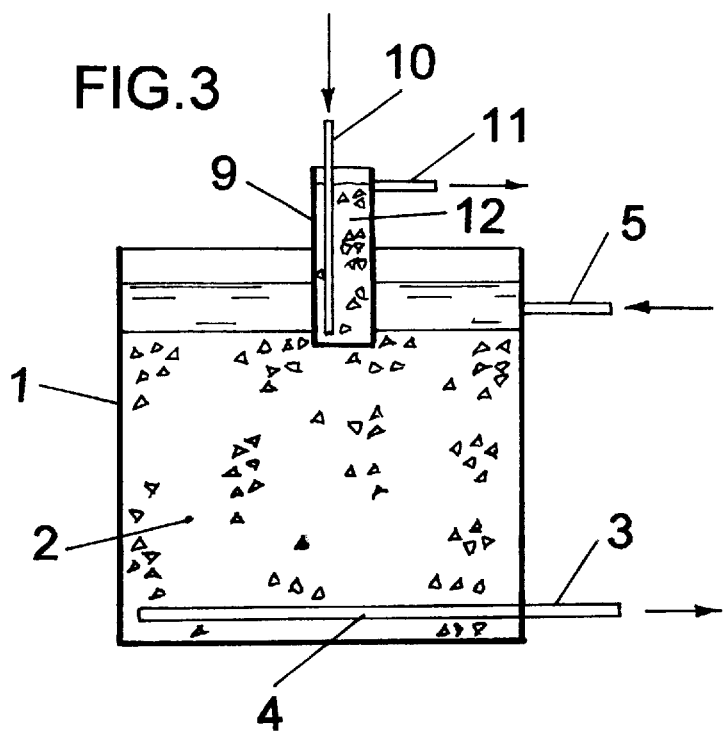
FIG. 3 is an alternative design of the reactor of FIG. 1.

Referring now to FIG. 3, there is shown a reactor as described in FIG. 1 and further provided with a means for striking the said metal pieces across a partition, comprising a container 9 with an electrolyte feed line 10, a line 11 for the evacuation of the spent electrolyte, and an optional sacrificial metal pieces 12 inside the said container 9, the said container 9 is in the electrical contact with the said metal bed 2. The container 9 can be made from a noble metal or from a sacrificial metal. The noble metal container will not corrode. For example, copper container will not corrode in a system with the sacrificial iron. The iron container will corrode and therefore is expendable with the sacrificial iron. The system is operated similarly to that shown in FIG. 1, but the induction step is carried out by conducting a cementation reaction in the container 9 by feeding electrolyte with reducible ions and reacting it either with the walls of the container 9 made of the sacrificial metal, or with sacrificial metal pieces placed in the container 9 made of noncorroding metal. Electromagnetic fields and microscopic electrical circuits induced inside the container 9 will be transmitted to the sacrificial metal bed 2 due to the contact between the bed 2 and the container 9. The spent electrolyte is not toxic and can be either discharged, or used for other purposes, or treated without generating hazardous streams.

Figure 4:
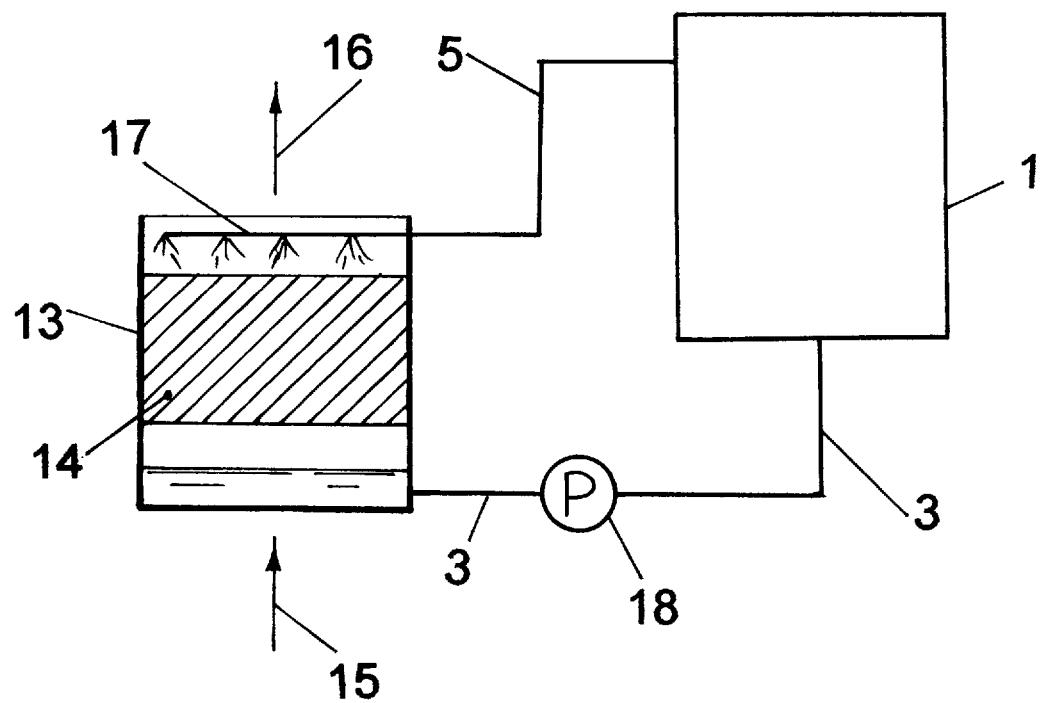
FIG. 4 is a system for treatment of gaseous streams.

Referring now to FIG. 4, there is shown a system for treatment of gaseous streams comprising a reactor 1 with the sacrificial metal bed (not shown), and an absorber 13 for transferring in the aqueous solution the constituents of the gas to be treated by the sacrificial metal, the said absorber is optionally provided with a contact bed 14, influent and effluent lines 15 and 16, a distributor for the aqueous solution 17, and lines 5 and 3 with a pump 18 for circulating the aqueous solution between the reactor 1 and the absorber 13. Reactor 1 can be a design as depicted in FIGS. 1, or 2, or 3, or an alternative design. Various modifications of the absorber 13 can also be used. For particular conditions, one skillful in art can design a single apparatus for combining the functions of the reactor 1 and the absorber 13. The materials to be treated enter the absorber 13 with a gaseous stream, such as polluted air, or a vent gas in the chemical storage tank, or in a chemical reactor or other process, or other gaseous stream, via line 15, pass through the contact bed 14 irrigated with the aqueous solution using the distribution means 17, become absorbed by the aqueous solution, and conveyed via line 3 by the pump 18 to the apparatus 1 such as described in FIGS. 1 to 3, or modifications thereof, This solution is treated in the apparatus 1 and recycled to the absorber 13. The treated gas is evacuated from the absorber 13 via line 16.

Referring now to FIG. 5, there is shown a cross-section of a permeable underground structure 1 which can be a circular well, or a rectangular cavity in the ground layer 21 having a water bearing stratum 19 with a flowing stream of polluted water 20. The structure 1 is filled with the sacrificial metal bed 2 spanning the thickness of the groundwater stratum (or its polluted portion). The portion of the structure above the groundwater level and above the bed 2 is supported by a casing 22. It can alternatively be filled with a soil or other material. The bed 2 is provided with the line 7 for feeding the previously described electrolyte and additional reagents, and/or by means 9 for striking the bed 2 across the partition as described above. Granular material, preferably GAC, can be provided to form the bed 8 (not shown) within the voids between the metal pieces in the bed 2. The structure 1 is similar to the reactors and filters described in FIGS. 1, 2, and 3. The groundwater filtering through the bed 2 is treated as previously described. The induction of the treatment is provided by the electrolyte and the additional reagents via line 7 and/or by using means 9. The GAC is used to adsorb the constituents not treatable by the metal and the products of the metal treatment. The biodegradable fraction of these constituents will be further treated. As in previous embodiments, microorganisms can be added to the GAC bed 8.

While the invention has been described in detail with particular reference to preferred embodiments thereof, it will be understood that variations and modificationscan be effected within the spirit and scope of the invention as previously described and as defined by the claims. For example, various combinations of the described embodiments can be used, reactors can be operated under elevated pressure and/or temperature, and various external electrical circuits can be used to induce the treatment processes.

I claim:

1. A method of treatment of materials with the use of a sacrificial metal and reducible metal ions which comprises the steps of
   a) contacting the material to be treated with a surface of the said sacrificial metal, wherein the said material to be treated is included in a medium selected from the group consisting of an aqueous solution, an aqueous emulsion, an aqueous suspension and combinations thereof; and
   b) inducing treatment processes at the surface of the said sacrificial metal by providing said reducible metal ions included in an electrolyte, wherein the said reducible metal ions react with the said sacrificial metal to form reduced metal ion species in dissolved or suspended form and said sacrificial metal is oxidized to form oxidized metal ion species in dissolved or suspended form.

2. The method of claim 1, wherein the said materials to be treated are selected from the group consisting of organic compounds, suspended or emulsified particles, metal containing species, microorganisms, and combinations thereof.

3. The method of claim 1, wherein the said sacrificial metal is selected from the group consisting of Zn, Al, Fe, and Ni.

4. The method of claim 1, wherein the said reducible metal ions are selected from the group consisting of Ni and Fe ions, or combinations thereof.

5. The method of claim 1, wherein the said reducible metal ions are produced by a process selected from the group consisting of a dissolution of a dry salt, and an anodic dissolution of a metal, or a combination thereof.

6. The method of claim 1, wherein the said reducible metal ions are provided continuously.

7. The method of claim 1, wherein the said reducible metal ions are provided periodically.

8. The method of claim 1, wherein electric current from an outside source is applied to the said sacrificial metal.

9. The method of claim 1, wherein the rate and the efficiency of the said treatment processes are increased by steps selected from the group consisting the addition of at least one indifferent ion to said electrolyte, the addition of at least one anion to said electrolyte, the addition of at least one completing agent to said electrolyte, the addition of at least one hydride compound to said electrolyte, optimizing pH of the said electrolyte, increasing temperature of the said electrolyte, optimizing the mixing rate of the said electrolyte, optimizing oxidation-reduction potentials in the said electrolyte, or a combination thereof.

10. The method of claim 1, wherein the rate and the efficiency of the said treatment processes are increased by steps selected from the group consisting of the addition of at least one indifferent ion to said aqueous solution, the addition of at least one anion to said aqueous solution, the addition of at least one complexing agent to said aqueous solution, the addition of at least one hydride compound to said aqueous solution, optimizing pH of the said aqueous solution, increasing temperature of the said aqueous solution, optimizing the mixing rate of the said aqueous solution, optimizing oxidation-reduction potentials in the said aqueous solution, or a combination thereof.

11. The method of claim 1, wherein the said electrolyte and the said aqueous solution containing material to be treated is the same solution.

12. The method of claim 1, wherein the said sacrificial metal is selected from the group consisting of finely divided metal pieces, medium size metal pieces, large size metal pieces, or combinations thereof.

13. The method of claim 12, wherein at least some of the said metal pieces are in electrical contact with each other.

14. The method of claim 12, wherein the said reducible metal ions are provided to a portion of the said metal pieces.

15. The method of claim 12, wherein the said reducible metal ions are provided to the said metal pieces across an electroconducting partition.

16. The method of claim 12, wherein the said sacrificial metal pieces are placed in a sacrificial bed submerged in a bed of a filtration medium.

17. The method of claim 16, wherein the said sacrificial bed sinks into the said bed of a filtration medium.

18. The method of claim 16, wherein the said filtration medium is selected from the group consisting of gravel, sand, glass beads, coal, green sand, ceramsite, ilmenite, garnet, plastic beads, granular activated carbon, synthetic adsorption media, zeolite, ion exchange resins, and combinations thereof.

19. The method of claim 16, wherein microorganisms are added to the said filtration medium.

20. The method of claim 16, wherein compounds for supporting biological processes are added to the said filtration medium.

21. The method of claim 1, wherein the said aqueous solution or emulsion or suspension is selected from the group consisting of surface water, groundwater, drinking water, process water, wastewater, aqueous media from intermediate steps of water and wastewater treatment, aqueous based absorption media derived from gas treatment processes, aqueous based leachates separated from solid materials or solid waste, aqueous based leachates within solid materials or solid waste.

22. The method of claim 1, wherein the said reduced metal ion species and/or oxidized metal ion species are used as coagulants.

23. The method of claim 1, wherein the said reduced metal ion species and/or oxidized metal ion species are used as reagents.

24. The method of claim 1, wherein the said process steps (a) and (b) are applied to in-situ groundwater treatment.

* * * * *